May 23, 1933.  H. A. HIPPOLD ET AL  1,909,959
THEFT PREVENTING DEVICE
Filed July 21, 1932
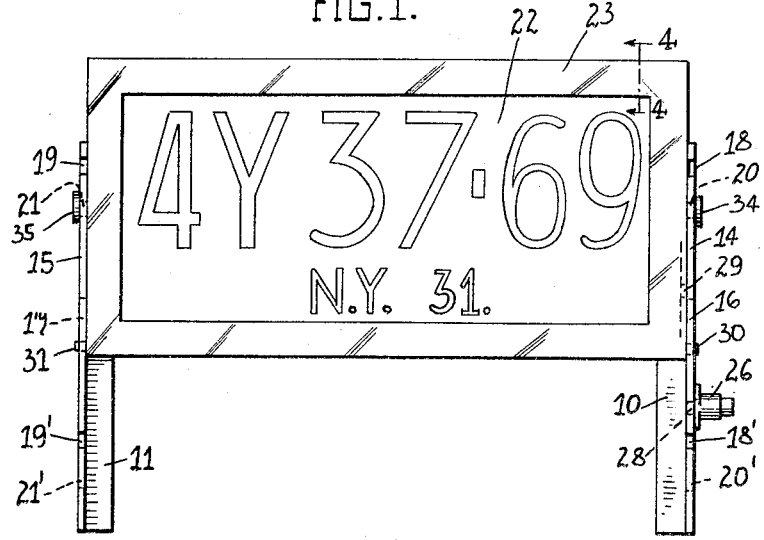
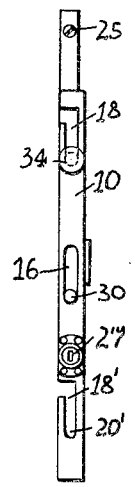
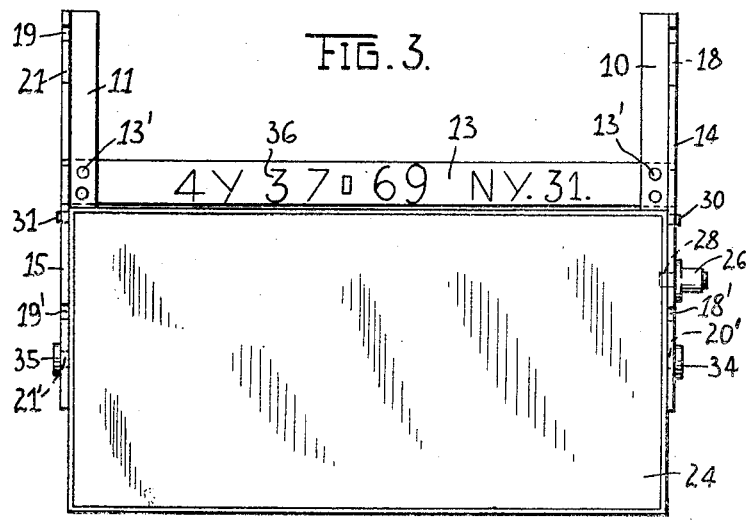
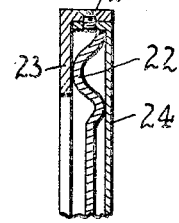
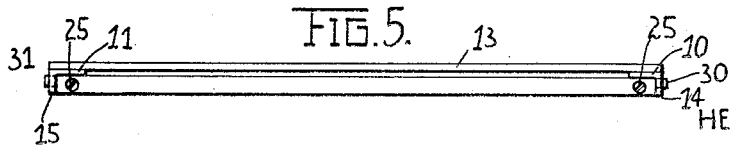
INVENTORS
HENRY ANTON HIPPOLD
MARTIN M. GOTTLIEB
BY their ATTORNEY Patented May 23, 1933

1,909,959

UNITED STATES PATENT OFFICE

HENRY ANTON HIPPOLD AND MARTIN M. GOTTLIEB, OF NEW YORK, N. Y.

THEFT-PREVENTING DEVICE

Application filed July 21, 1932. Serial No. 623,777.

This invention relates to theft preventing devices, and more particularly to devices for preventing theft of automobiles.

It is generally considered dangerous to leave unguarded automobiles upon a street, as many cases of theft have been reported as result of such action.

Most of the states have laws compelling owners of automobiles to prominently display thereon license plates, and any automobile detected as operating without such license will be subject to an investigation, and serious consequences may result.

It is an object of our invention therefore to provide a license plate holder including a frame, adapted to rotate into a position where the legend on the plate is plainly visible, and having means to permit rotation of the same into a position where the legend on the plate cannot be read, thus making it dangerous for unauthorized persons to make use of the automobile when the plate is in that position.

Still another aim of our invention is the provision of means for retaining the plate carrying frame in either of its adjusted positions by a bayonet joint device.

Another aim of our invention is the provision of means for preventing unauthorized persons from rotating the license plate from its legend concealing position into its normal position.

It is a yet further aim of our invention to provide means for positive identification of the automobile, when its license plate is in a pendant or legend concealing position.

And another object of our invention is the provision of a license plate frame comprising two sections adapted to be separated for the exchange of license plates.

These and other advantages of our invention will become more fully apparent as the description thereof proceeds, and will then be specifically defined in the appended claim.

In the accompanying drawing, forming a material part of this disclosure:

Figure 1 is a front elevational view of a conventional license plate, mounted in accordance with our invention.

Figure 2 is an end elevational view of the parts shown in Figure 1.

Figure 3 shows the license plate in pendant or legend concealing position.

Figure 4 is a section taken on line 4—4 of Figure 1.

Figure 5 is a top plan view of the device.

The invention consists of a pair of opposed angle brackets secured in parallel relation to that part of the vehicle where the license plate usually appears. These angle brackets 10—11 are supported by a support bar 13 extending horizontally between the brackets and secured thereto by screws 13' slightly above the center of the brackets. The outstanding elements 14—15 of the brackets have substantially in their center, slots 16—17. Also provided on the outstanding elements 14—15 of the brackets 10—11 are slots 18—18' and 19—19' having right angled extensions 20—20' and 21—21', parallel with slots 16—17.

License plate 22, bearing individual combinations of letters, numerals, locality and year, is held in an open face frame 23 and backing plate 24, united at various points by screws 25.

Fixed on one of the end edges is a lock 26 having a key escutcheon 27 and slide bolt 28 adapted to engage in opening 29 when the license plate is in a pending or legend concealing position.

Extending from the center of the frame edges are hinge pins 30—31, slidably held in slots 16—17, and are prevented from disengagement by their outer heads 32—33 of a diameter greater than the width of the slots 16—17. Fixed pins 34—35 extend from the frame edges, parallel with hinge pins 30—31, and arranged thereabove. These fixed pins 34—35 are engageable in slots 18—18' and 19—19' respectively to pass into right angled extensions 20—20' and 21—21', depending upon the position of the license plate, and constitute bayonet joint connections in either of which the pins are retained by gravity.

When the license plate and its frame is in a pendant position, as shown in Figure 3, bar 13 becomes visible. Painted or otherwise indicated upon this bar 13 is the legend of the license plate, as at 36, allowing identification of the vehicle when not in operation, yet being insufficient for operation when in this position.

In operation, when the operator of the automobile intends to leave it unguarded for any length of time, he raises the frame, draws it forward to release the pins from slots 20—21, turns the frame on pivot pins 30—31, enters pins 34—35 in slots 20'—21', and he then releases the bolt of lock 26 by the use of the proper key, to enter opening 28, in which position the plate will be firmly held, until, by insertion of the key into the escutcheon, the bolt is withdrawn, and the plate rotated into its normal position.

If, when the plate is in its legend concealing position, an unauthorized person enters the car and uses it, he runs the risk of being stopped by an officer of the law, and explanation will be requested, inasmuch as the vehicle is being operated without license. To make this condition more easily noticeable, rear plate 24 of the frame is preferably painted red or any other bright color.

If, when the car is left unguarded but not operated, it is desired to identify the car by license number, bar 13, which becomes visible when the license plate is in pendant position, will furnish this information. This is not sufficient for operating purposes however, and questioning of a driver will result even though the license number is stated upon bar 13.

The foregoing disclosure is to be regarded as descriptive and illustrative only and not as limitative or restrictive of the invention, of which obviously an embodiment may be constructed including many modifications without departing from the general scope herein indicated and denoted in the appended claim.

Having thus described the invention, what is claimed as new and desired to be secured by Letters Patent, is:

In combination, a license plate carrying frame having hinge pins at its center edges, angle supports having slots in their center in which said hinge pins are slidably held, fixed pins on said frame edges above said hinge pins, vertical slots in said angle supports above and below said center slots and equally spaced therefrom, said upper and lower slots having open right angled upper ends, said fixed pins adapted to selectively engage either of the open slots, a lock on said angle support having a bolt, an opening in said frame for engagement with said bolt when the plate is in pendant position, and means to identify the vehicle carrying said plate when in pendant position.

In witness whereof we have signed our names to this specification.

HENRY ANTON HIPPOLD.
MARTIN M. GOTTLIEB.